United States Patent
Wilcox et al.

(10) Patent No.: US 6,918,598 B2
(45) Date of Patent: Jul. 19, 2005

(54) HOT AIR SEAL

(75) Inventors: David E. Wilcox, Gilbert, AZ (US);
Mary Berti, Tempe, AZ (US)

(73) Assignee: Honeywell International, Inc., Morristown, NJ (US)

(*) Notice: Subject to any disclaimer, the term of this patent is extended or adjusted under 35 U.S.C. 154(b) by 165 days.

(21) Appl. No.: 10/114,876

(22) Filed: Apr. 2, 2002

(65) Prior Publication Data

US 2003/0184026 A1 Oct. 2, 2003

(51) Int. Cl.⁷ ............................................. F16J 15/02
(52) U.S. Cl. .................. 277/638; 277/628; 277/637; 165/81; 165/134.1; 165/176
(58) Field of Search ..................... 277/628, 637, 277/647, 641, 642, 644, 638; 165/81, 82, 83, 134.1, 176

(56) References Cited

U.S. PATENT DOCUMENTS

| | | | |
|---|---|---|---|
| 1,073,916 A | 9/1913 | Ljungstrom | |
| 3,698,743 A | 10/1972 | Sweet et al. | |
| 3,754,766 A * | 8/1973 | Asplund | 277/644 |
| 3,870,099 A * | 3/1975 | Wolowodiuk | 165/82 |
| 4,072,327 A | 2/1978 | Young | |
| 4,379,560 A | 4/1983 | Bakken | |
| 4,401,157 A * | 8/1983 | Cadars | 165/173 |
| 4,733,722 A * | 3/1988 | Forbes et al. | 165/159 |
| 4,735,260 A * | 4/1988 | Wohrl et al. | 165/69 |
| 4,746,129 A * | 5/1988 | Puccio | 277/641 |
| 4,781,388 A | 11/1988 | Wöhrl et al. | |
| 4,921,680 A * | 5/1990 | Bonk et al. | 422/197 |
| 5,065,816 A * | 11/1991 | Darragh | 165/125 |
| 5,228,255 A * | 7/1993 | Hahn | 52/396.04 |
| 5,458,344 A * | 10/1995 | Weiler et al. | 277/634 |
| 5,516,123 A | 5/1996 | Eckel | |
| 5,797,723 A | 8/1998 | Frost et al. | |
| 6,164,656 A | 12/2000 | Frost | |
| 6,431,825 B1 * | 8/2002 | McLean | 415/135 |
| 6,474,408 B1 * | 11/2002 | Yeh et al. | 165/82 |

* cited by examiner

*Primary Examiner*—John P. Walsh
*Assistant Examiner*—Carlos Lugo
(74) *Attorney, Agent, or Firm*—Robert Desmond, Esq.

(57) ABSTRACT

A hot air sealing arrangement for sealing between an inner surface of an exhaust duct conveying hot combustion products and an outer surface of a heat exchanger disposed within the exhaust duct includes an inner receiver attachable to the outer surface of the heat exchanger, an outer receiver attachable to the inner surface of the exhaust duct, and a seal having an outer bead engageable with the outer receiver for rotary movement therein and an inner bead engageable with the inner receiver for sliding movement therein. The seal further includes a connecting sheet between the outer bead and the inner bead.

5 Claims, 8 Drawing Sheets

HOT AIR SEAL

GOVERNMENT RIGHTS

This invention was made with Government support under contract no. DAAE0700CN086 awarded by the United States Army. The government has certain rights in this invention.

BACKGROUND OF THE INVENTION

The present invention generally relates to apparatus and methods for sealing a high temperature gas and, more specifically, to apparatus and methods for sealing between the inner surface of an exhaust gas duct and a heat exchanger disposed within the duct.

A sealing arrangement for such an application must accommodate relative movement of the heat exchanger relative to the duct due to thermal expansion. This relative movement generally includes both translation and rotation.

Seals for such high temperature applications differ from the familiar gaskets, O-rings, etc employed in fluid systems at low temperatures because elastomeric materials used at low temperatures are unsuitable for service at the high temperatures encountered in applications involving hot combustion products. Seals for high temperature applications generally employ metals suitable for high temperature application, and in some cases employ refractory fibers.

An early high temperature seal is described in U.S. Pat. No. 1,073,916 which is intended for use in steam turbines to seal between two relatively displaceable parts. The seal of this invention has a connecting member having a bead on each edge. The beads fit into recesses in the two relatively displaceable parts. The edges of the recesses are bent around the beads to capture them. Assembly and replacement of the seals is therefore difficult. Furthermore, this sealing arrangement provides for a very small number of degrees of freedom of relative displacement of the two parts.

U.S. Pat. No. 3,698,743 teaches a combustion liner joint having a ring which seals between relatively moveable inner and outer sections of the combustion liner. Only one degree of freedom is cited for the relative displacement of the two sections. Furthermore, at reduced temperatures the two sections are only loosely connected.

U.S. Pat. No. 4,379,560 teaches an annular seal for sealing between two concentric tubular elements in a gas turbine. The seal is formed as an annular sheet of metal having a bead at its inner radius and a bead at its outer radius. The outer bead fits in an inwardly facing annular groove in the outer of the two concentric tubular elements and the inner bead fits in an outwardly facing groove in the inner of the two concentric tubular elements. This seal accommodates axial and radial displacement of the inner element relative to the outer element. It appears to be difficult to assemble and accommodates only a relatively small number of relative displacements.

U.S. Pat. No. 6,164,656 teaches a seal spring for sealing between relatively moving parts in a gas turbine engine. This seal has the undesirable feature that the seal spring is under stress, a fact that severely limits its life.

In short, prior art seals for high temperature application generally accommodate a small number of degrees of freedom in the relative displacement of the parts between which sealing is provided. Prior art seals are generally difficult to assemble, and in some cases include components under stress which limits their life.

As can be seen, there is a need for an improved sealing arrangement and method which facilitates assembly, accommodates a greater number of relative degrees of freedom of the relative displacement of the components between which sealing is provided, and which is not under stress when it is in use.

SUMMARY OF THE INVENTION

In one aspect of the present invention, a gas turbine engine comprises a compressor, a combustion chamber, a turbine, an exhaust duct connected to receive hot exhaust gases from the turbine, and a regenerative heat exchanger disposed in the exhaust duct to extract heat from the exhaust gases. The regenerative heat exchanger has a cold side connected to receive compressed air from the compressor and connected to supply pre-heated compressed air to the combustion chamber. An outer surface of the regenerative heat exchanger and an inner surface of the exhaust duct define a clearance therebetween. The improvement includes a hot air sealing arrangement for sealing between the outer surface of the regenerative heat exchanger and the inner surface of the exhaust duct. The hot air sealing arrangement includes an inner receiver attached to the outer surface of the regenerative heat exchanger, an outer receiver attached to the inner surface of the exhaust duct, a seal having an outer bead engaged with the outer receiver for rotary movement therein and an inner bead engaged with the inner receiver for sliding movement therein. The seal further includes a connecting sheet between the outer bead and the inner bead, the connecting sheet having a cross section formed as a U having unequal legs whereby the sealing arrangement accommodates multi-axis displacement of the regenerative heat exchanger relative to the exhaust duct without flexure of the seal, without flexure of the outer receiver, and without flexure of the inner receiver.

In another aspect, the present invention is a hot air sealing arrangement for sealing between an inner surface of an exhaust duct conveying hot combustion products and an outer surface of a heat exchanger disposed within the exhaust duct for extracting heat from the hot combustion. The hot air sealing arrangement comprises an inner receiver attachable to the outer surface of the heat exchanger, an outer receiver attachable to the inner surface of the exhaust duct, a seal having an outer bead engageable with the outer receiver for rotary movement therein and an inner bead engageable with the inner receiver for sliding movement therein. The seal further includes a connecting sheet between the outer bead and the inner bead.

In an additional aspect of the present invention, an energy recovery unit for extracting heat from exhaust gases in an exhaust duct includes a heat exchanger disposed in the exhaust duct, the heat exchanger being for extracting heat from the exhaust gases. The outer surface of the heat exchanger and the inner surface of the exhaust duct define a clearance therebetween. A hot air sealing arrangement for sealing between the outer surface of the regenerative heat exchanger and the inner surface of the exhaust duct includes an inner receiver attached to the outer surface of the regenerative heat exchanger, an outer receiver attached to the inner surface of the exhaust duct, a seal having an outer bead engaged with the outer receiver for rotary movement therein and an inner bead engaged with the inner receiver for sliding movement therein, the seal further including a connecting sheet between the outer bead and the inner bead. The connecting sheet has an inner portion inclined at a small angle relative to a tangent to the heat exchanger at the inner bead.

In another aspect, the present invention is a method of sealing between an inner surface of an exhaust duct and an outer surface of a heat exchanger disposed within the exhaust duct, the inner surface of the exhaust duct and the outer surface of the heat exchanger defining a clearance therebetween. The method comprises: attaching an inner receiver to the outer surface of the heat exchanger; attaching an outer receiver to the inner surface of the exhaust duct; forming a seal having an inner bead, an outer bead and a connecting sheet between the inner bead and the outer bead; splitting the exhaust duct transversely to remove a removable duct portion and inserting the seal whereby the outer bead engages the outer receiver for rotary motion therein and the inner bead engages the inner receiver for sliding motion therein; replacing the removable duct portion so that an interference member on the removable duct portion holds the seal in position; and whereby multi-axis displacement of the regenerative heat exchanger relative to the exhaust duct is accommodated without flexure of the seal, without flexure of the outer receiver, and without flexure of the inner receiver.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a seal for high temperature applications which accommodates multi axis displacement of the components between which sealing is required. The seal of the present invention does not require flexure of its components, and does not require resilient members. Thus, it has longer life than prior art seals. The seal of the present invention differs from prior art seals by combining rotation and sliding movements relative to the components being sealed in a novel manner. This is unlike the prior art cited above. The invention is particularly appropriate for sealing hot combustion gases, particularly the exhaust gases from a gas turbine engine. The present invention is particularly intended for the LV100-5 gas turbine engine.

Figure 1:
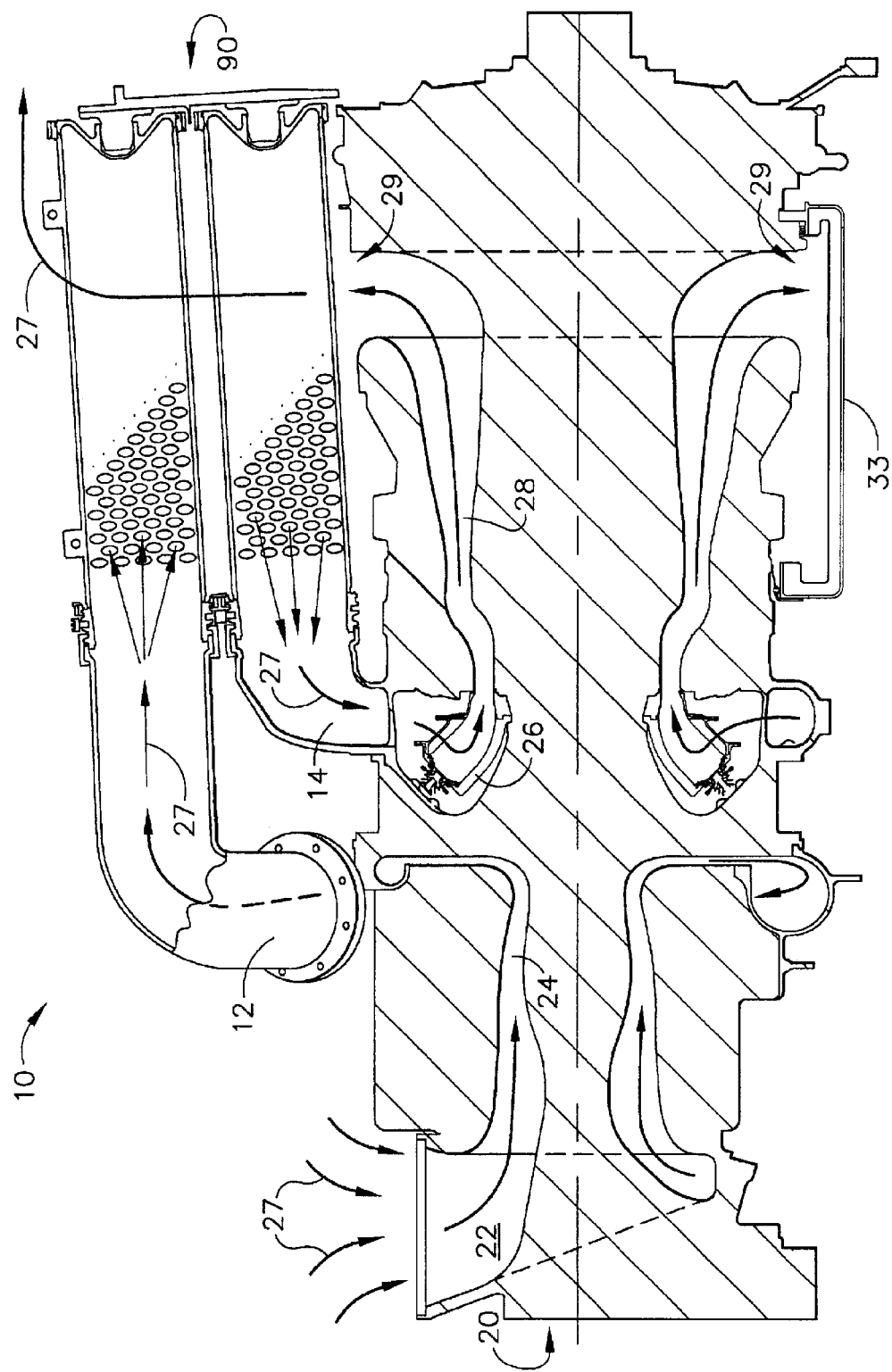
FIG. 1 is a schematic median section of a gas turbine engine system according to one embodiment of the invention.

Attention is directed to FIG. 1 which illustrates a gas turbine engine system, generally designated 10, having a gas turbine engine, generally designated 20 and an energy recovery unit, generally designated 90. The gas turbine engine 20 may include an air inlet 22, a compressor 24, a combustion chamber 26 and a turbine 28.

In order to use waste heat from turbine 28 to preheat the air entering combustion chamber 26, compressed air may exit from compressor 24 through passage 12 to energy recovery unit 90. After being heated in energy recovery unit 90, the heated compressed air may flow through passage 14 to combustion chamber 26 where fuel may be burned to increase its temperature further. It may then drive turbine 28 and exit through turbine outlets 29.

Figure 2:
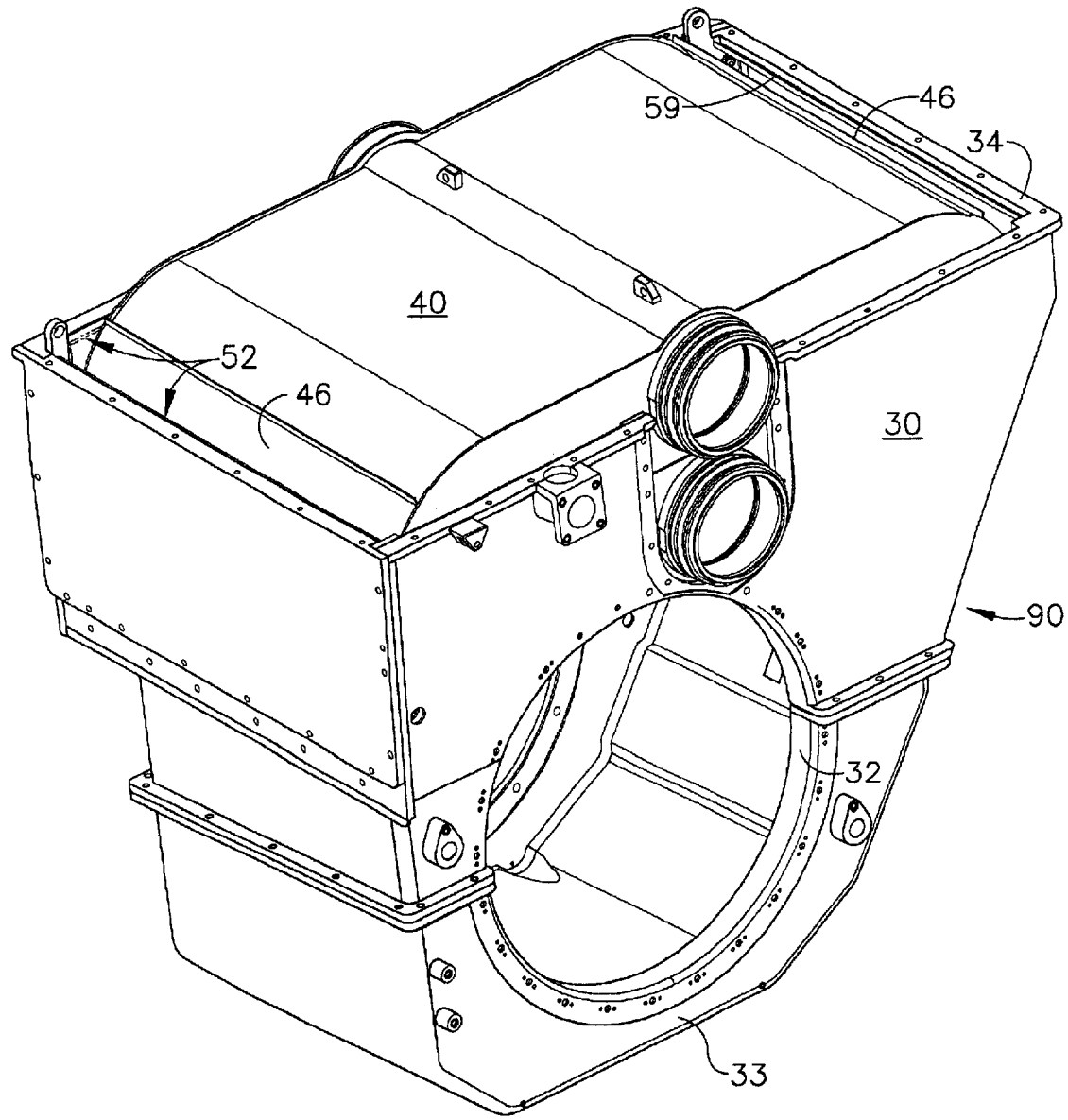
FIG. 2 is a perspective illustration of the one embodiment of the invention applied to an energy recovery unit for the gas turbine engine system of FIG. 1.
Figure 3:
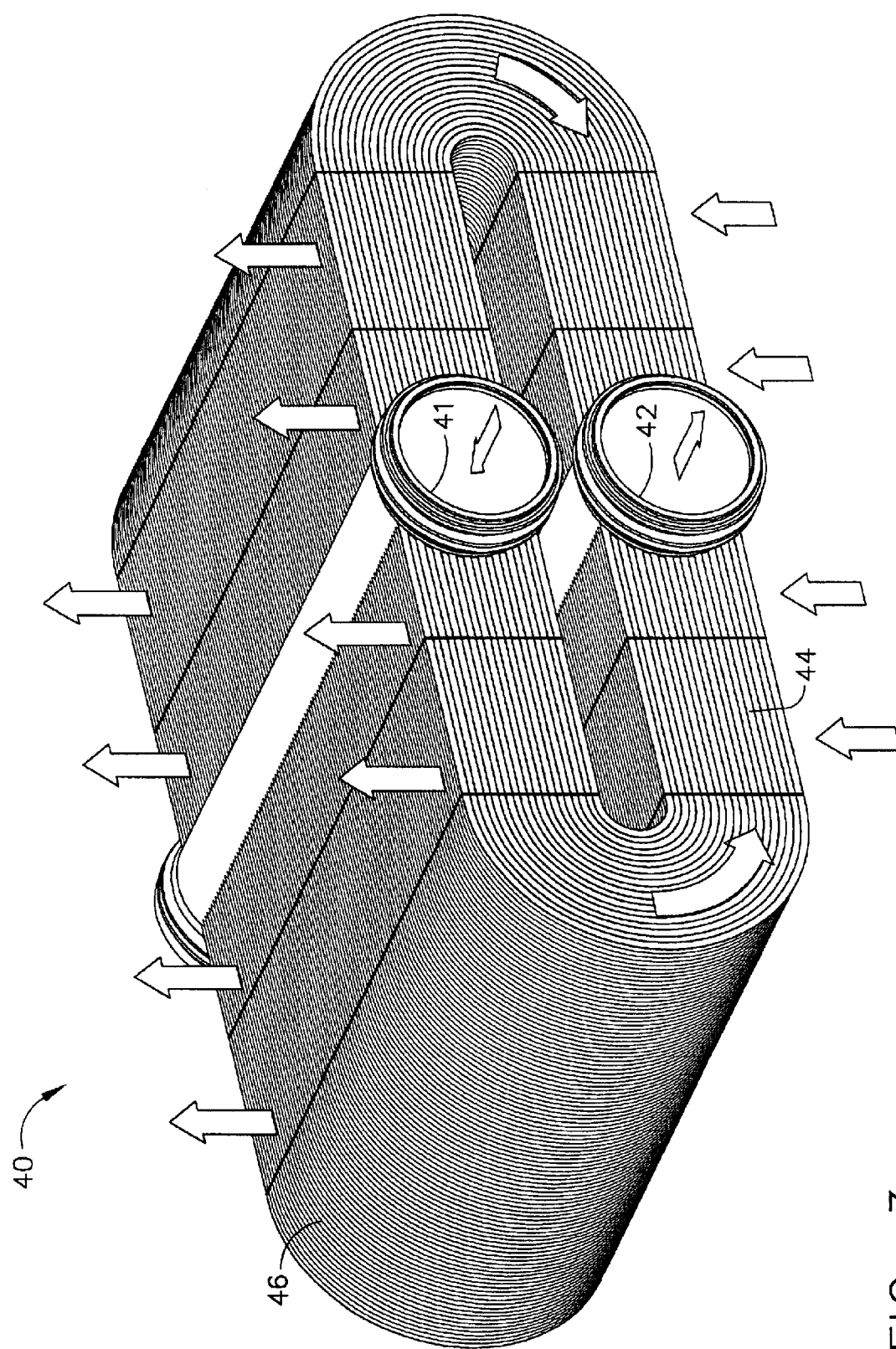
FIG. 3 is a perspective illustration of a heat exchanger comprised in the energy recovery unit of FIG. 2.

Detail regarding the energy recovery unit 90 is provided by FIGS. 2 and 3. Energy recovery unit 90 may include the exhaust duct, generally designated 30, which may enclose the heat exchanger, generally designated 40. Exhaust duct 30 is best seen in FIG. 2 and heat exchanger 40 is illustrated in FIG. 3. Referring again to FIG. 1, flow arrow 27 shows the path that air may follow through the inlet 22, the compressor 24, the heat exchanger 40, the combustion chamber 26, and the exhaust duct 30.

Referring to FIGS. 1 and 2, it is noted that exhaust duct 30 may have opening 32 which surrounds turbine 28 to receive exhaust gases through a radial turbine outlet 29. A lower portion 33 of exhaust duct 30 is seen in both FIG. 1 and FIG. 2. Heat exchanger 40 may have an inlet header 41 to which passage 12 is attached to introduce compressed air from compressor 24. Likewise, heat exchanger 40 may have an outlet header 42 to which passage 14 may be attached to convey heated air to combustion chamber 26.

FIG. 3 shows heat exchanger 40 and FIG. 2 shows its disposition within exhaust duct 30. Air may pass from inlet header 41 to outlet header 42 through tubes 44 (FIG. 3). Exhaust gases from exhaust duct 30 (FIG. 2) may pass through the heat exchanger 40, and around the tubes 44 to supply heat from the exhaust gases to relatively cold air inside the tubes 44.

Figure 4A:
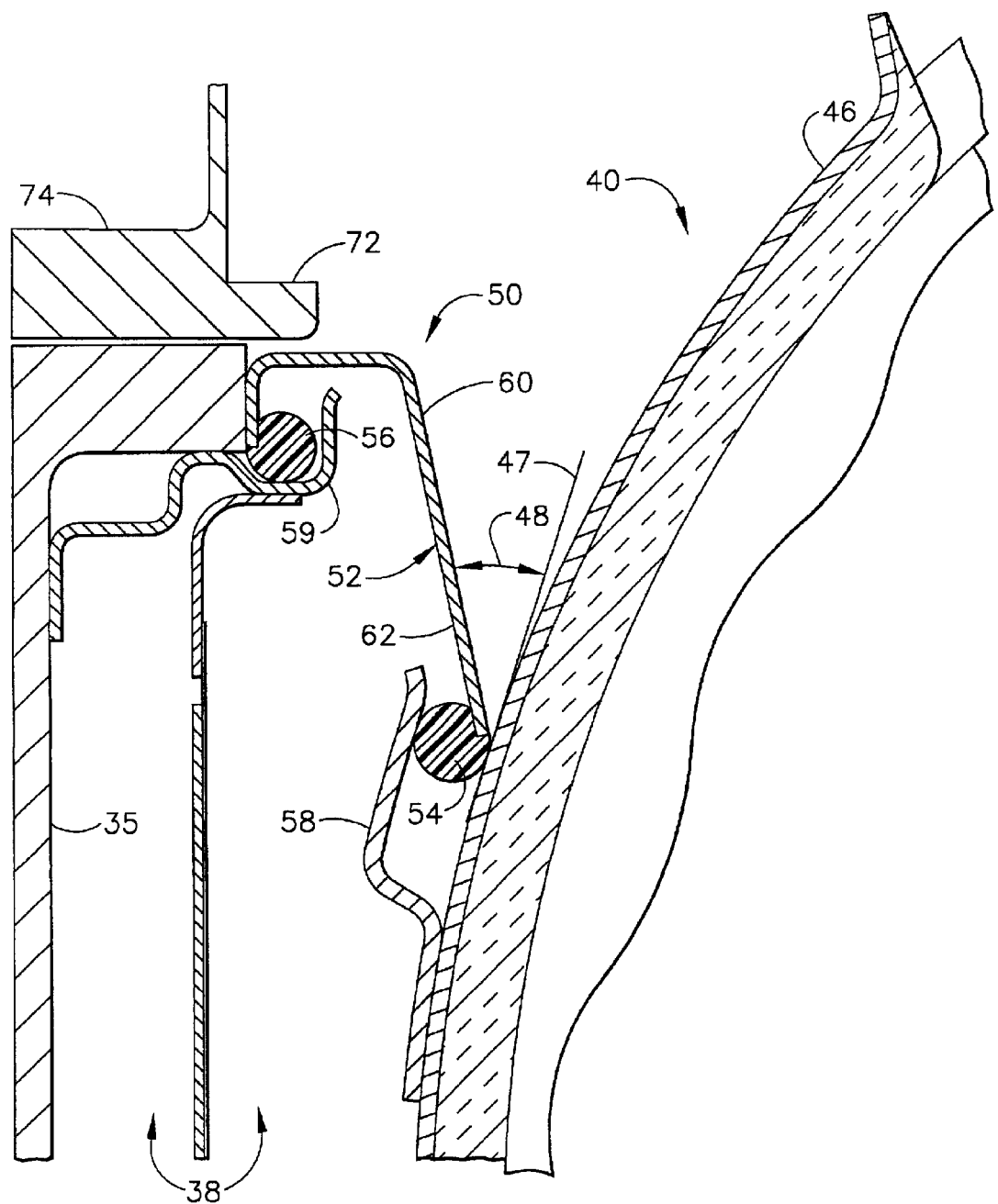
FIG. 4a is a sectional diagram of the invention applied to seal a clearance between the exhaust duct shown in FIG. 2 and the heat exchanger illustrated in FIG. 3.

Seals 52, according to the present invention, which are seen in FIG. 2, may seal between heat exchanger 40 and exhaust duct 30. Seals 52 may be disposed adjacent the flange 34 of exhaust duct 30. FIG. 4a illustrates a hot air sealing arrangement, generally designated 50, according to the present invention. Hot air sealing arrangement 50 may include seal 52 having an inner bead 54 disposed in inner receiver 58 which may be attached to outer surface 46 of heat exchanger 40. Likewise, seal 52 may have an outer bead 56 disposed in outer receiver 59 which may be attached to inner surface 35 of exhaust duct 30.

Figure 4B:
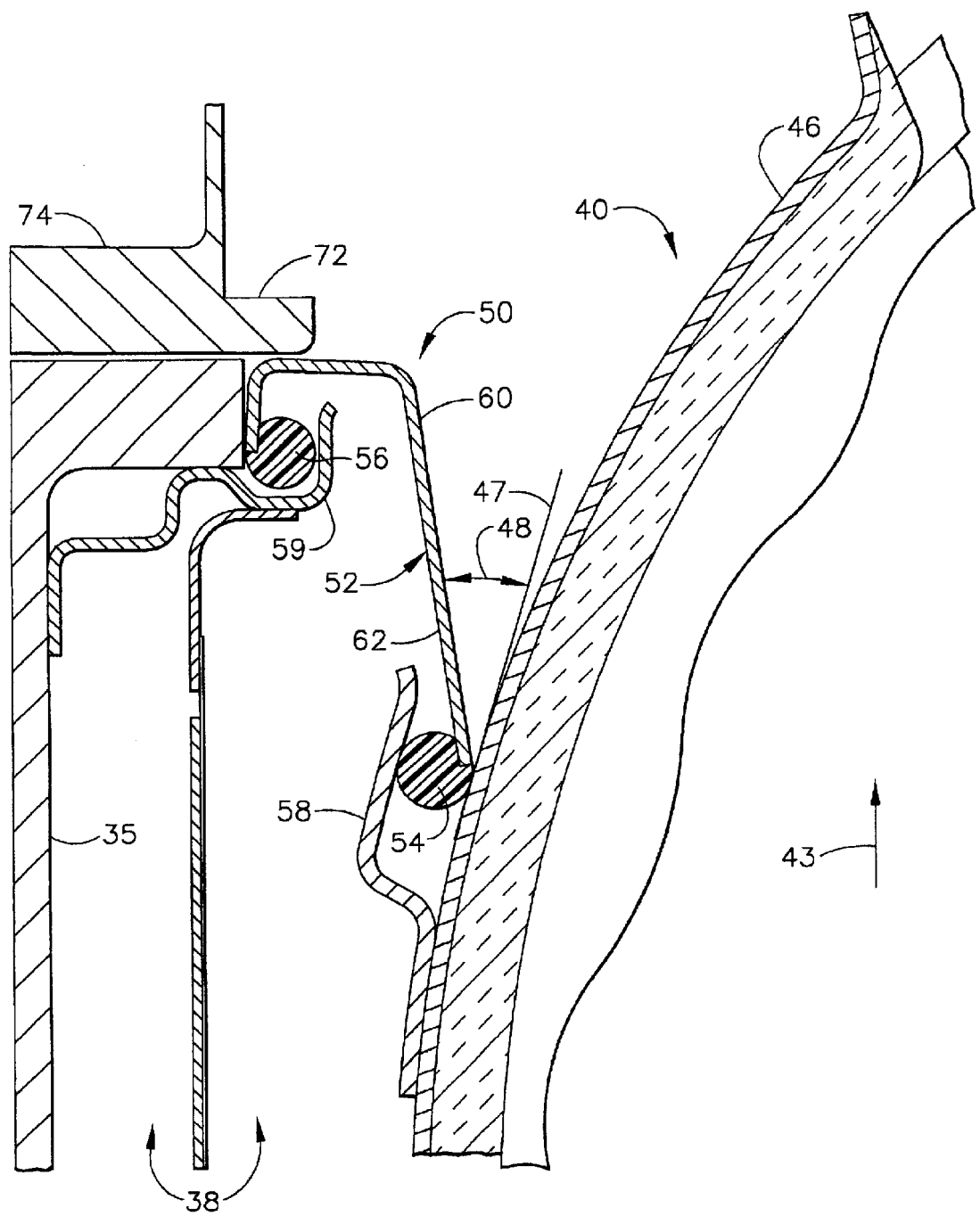
FIG. 4b is a sectional diagram similar to FIG. 4a with the heat exchanger displaced upwards due to thermal expansion.

FIG. 4b is similar to FIG. 4a except that heat exchanger 40 has been displaced upwardly in the direction 43 due to thermal expansion. This causes inner bead 54 to move deeper into inner receiver 58 and causes seal 52 to be rotated clockwise. This occurs without bending of seal 52.

Figure 5:
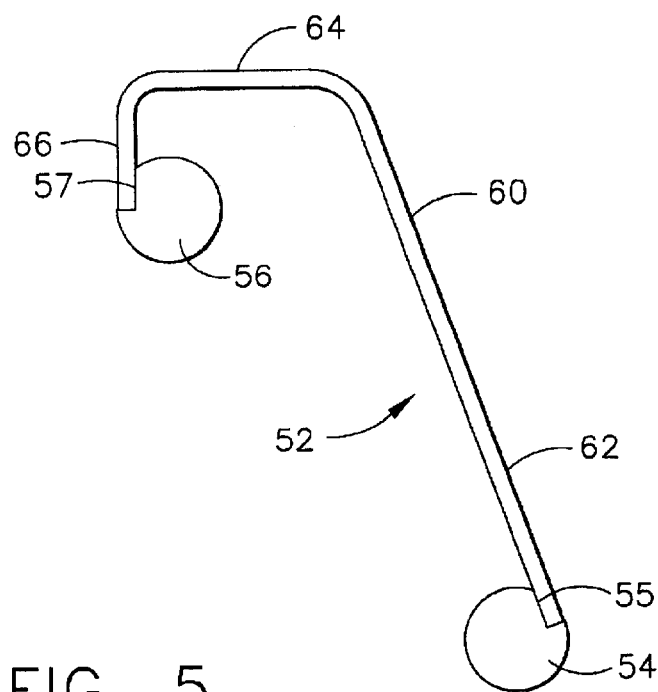
FIG. 5 is an illustration of the seal, showing the inner and outer legs and attachment of the inner and outer beads.

Additional detail regarding seal 52 is provided by FIG. 5. A connecting sheet 60 may be connected to both inner bead 54 and outer bead 56. Preferably, connecting sheet 60 has the form of a U (inverted) having unequal legs. Connecting sheet 60 may include inner leg 62, transverse portion 64 and outer leg 66. Inner leg 62 may be longer than outer leg 66.

Hot air sealing arrangement 50 (FIG. 4) may accommodate several degrees of freedom of relative displacement of heat exchanger 40 relative to exhaust duct 30. This may be accomplished by outer bead 56 which has rotary freedom within outer receiver 59, and by inner bead 54 which has both sliding freedom and rotary freedom within inner receiver 58. To accommodate sliding movement, inner receiver 58 may have greater depth than outer receiver 59.

In FIG. 4, tangent 47 to outer surface 46 of heat exchanger 40 is shown. Tangent 47 is disposed at a small angle 48 relative to inner leg 62 of connecting sheet 60. Angle 48 may be approximately 30 degrees. FIG. 4 also illustrates clearance 38 between the outer surface 46 of heat exchanger 40 and the inner surface 35 of exhaust duct 30. A high temperature insulation such as a refractory fiber blanket (not shown) may be disposed in clearance 38.

Figure 6:
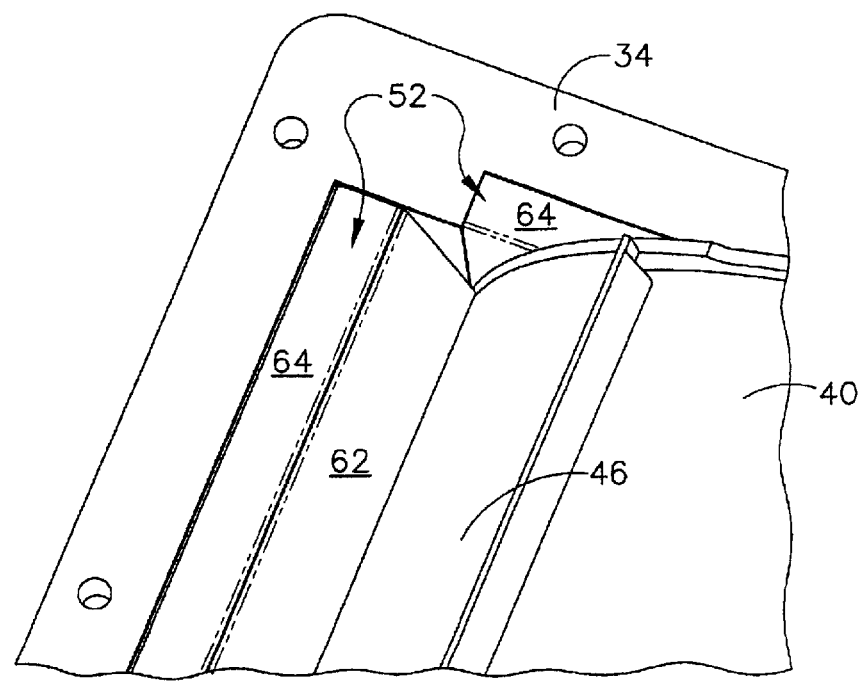
FIG. 6 is a perspective illustration of the seal, exhaust duct and heat exchanger shown in FIG. 4.
Figure 7:
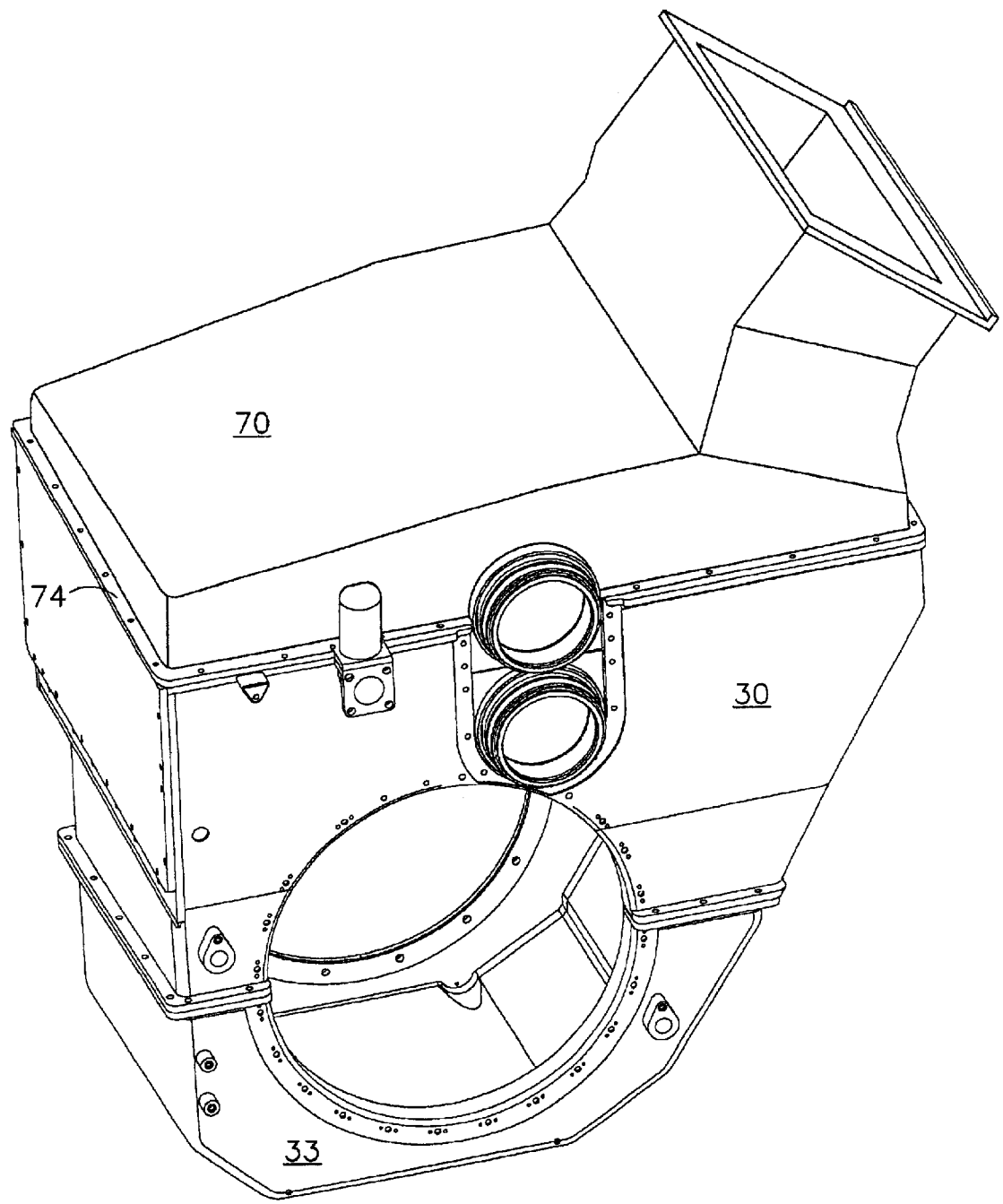
FIG. 7 is a perspective illustration of the energy recovery unit with a removable duct portion attached.

FIG. 6 is a corner detail illustrating two seals 52 which may prevent leakage of hot exhaust gasses in exhaust duct 30 past heat exchanger 40. FIG. 7 shows removable duct portion 70 having an interference member 72, visible in FIG. 4, which captures outer bead 56 of seal 52 in outer receiver 59 and constrains inner bead 54 to remain disposed within inner receiver 58. In one embodiment, interference member 72 may be an inward extension of flange 74 of removable duct portion 70. Inner receiver 58 and outer receiver 59 may be fish mouth receivers, as shown in FIG. 4.

One embodiment of seal 52 is illustrated in FIG. 5. Inner bead 54 may be attached to inner leg 62 of connecting sheet 60 by forming a notch 55 in inner bead 54 and welding, or, braising inner leg 62 into notch 55. In like manner, outer bead 56 may be attached to outer leg 66 of connecting sheet 60 by forming notch 57 in outer bead 56 and welding or braising outer leg 66 into notch 57.

A nickel alloy may be employed for connecting sheet 60. One specific embodiment is Inconel®. A cobalt alloy may be used for inner bead 54 and outer bead 56 to provide lubrication at high temperature. Hanes 188 and L605 are alloys that may be used for this application.

Figure 8:
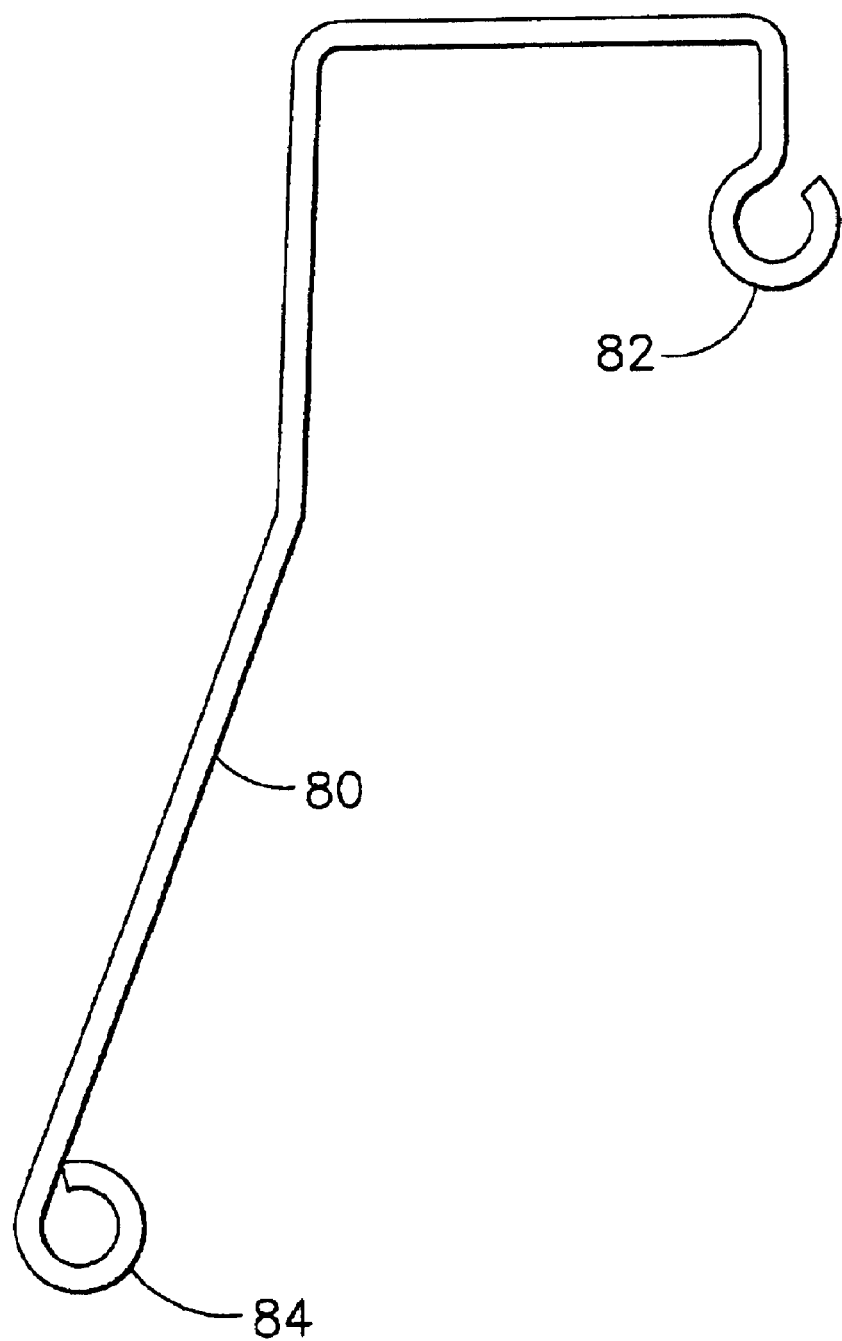
FIG. 8 illustrates an alternative seal having beads formed by rolling a sheet portion of the seal.

FIG. 8 illustrates an alternative construction for a seal 80. Seal 80 is made as an integral entity by rolling to form an inner rolled bead 84 and an outer rolled bead 82. It is noted that the relative positions of the inner rolled bead 84 and outer rolled bead 82 is reversed relative to the positions of the inner bead 54 and outer bead 56 shown in FIGS. 4 and 5.

Referring now to FIGS. 2, 3 and 4, the method of the present invention provides sealing between an inner surface 35 of an exhaust duct 30 and an outer surface 46 of a heat exchanger 40 disposed within the exhaust duct 30, the inner surface 35 of the exhaust duct 30 and the outer surface 46 of the heat exchanger 40 defining a clearance 38 therebetween. The method includes attaching an inner receiver 58 to the outer surface 46 of the heat exchanger 40 and attaching an outer receiver 59 to the inner surface 35 of the exhaust duct 30. The method further includes forming a seal 52 having an inner bead 54, an outer bead 56 and a connecting sheet 60 between the inner bead 54 and the outer bead 56. For assembly, the seal 52 is inserted whereby the outer bead 56 engages the outer receiver 59 for rotary motion therein and the inner bead 54 engages the inner receiver 58 for sliding motion therein. A removable duct portion 70 is then attached whereby interference member 72 of removable duct portion 70 holds seal 52 in position. Thus, multi-axis displacement of the regenerative heat exchanger relative to the exhaust duct is accommodated without flexure of the seal, without flexure of the outer receiver, and without flexure of the inner receiver.

As can be appreciated by persons skilled in the art, the present invention provides a sealing mechanism having a greater number of degrees of freedom for the relative movement of heat exchanger 40 in exhaust duct 30 than prior art seals, and the present invention does not require material flexure or springs.

It should be understood, of course, that the foregoing relates to preferred embodiments of the invention and that modifications may be made without departing from the spirit and scope of the invention as set forth in the following claims.

We claim:

1. An energy recovery unit for extracting heat from exhaust gases in an exhaust duct having an inner surface, said energy recovery unit comprising:

a heat exchanger disposed in said exhaust duct, said heat exchanger for extracting heat from said exhaust gases, an outer surface of said heat exchanger and said inner surface of said exhaust duct defining a clearance therebetween;

a hot air sealing arrangement for sealing between said outer surface of said heat exchanger and said inner surface of said exhaust duct, said hot air sealing arrangement including:

an inner receiver attached to said outer surface of said heat exchanger; an outer receiver attached to said inner surface of said exhaust duct; and a seal having an outer bead engaged with said outer receiver for rotary movement therein and an inner bead engaged with said inner receiver for sliding movement therein, said seal further including a connecting sheet between said outer bead and said inner bead, said connecting sheet having an inner portion inclined at a small angle relative to a tangent to said heat exchanger at said inner bead, and an outer portion that is shorter than said inner portion.

2. The energy recovery unit of claim 1, wherein said angle is about thirty degrees.

3. The energy recovery unit of claim 1, wherein said connecting sheet includes a transverse portion, said transverse portion disposed at an angle of about 90 degrees relative to said inner surface of said duct.

4. The energy recovery unit of claim 1, wherein said exhaust duct is split transversely so that a removable duct portion may be removed for assembly of said sealing arrangement.

5. The energy recovery unit of claim 4, wherein said seal is held in position by an interference member protruding inwardly from said removable duct portion.

* * * * *

UNITED STATES PATENT AND TRADEMARK OFFICE
CERTIFICATE OF CORRECTION

| | | |
|---|---|---|
| PATENT NO. | : 6,918,598 B2 | Page 1 of 1 |
| APPLICATION NO. | : 10/114876 | |
| DATED | : July 19, 2005 | |
| INVENTOR(S) | : David E. Wilcox et al. | |

It is certified that error appears in the above-identified patent and that said Letters Patent is hereby corrected as shown below:

Column 5, line 7, "FIG. 4" should be changed to --Figures 4a and 4b--.

Signed and Sealed this

Third Day of April, 2007

JON W. DUDAS
*Director of the United States Patent and Trademark Office*